(12) United States Patent
Kuo et al.

(10) Patent No.: US 8,131,850 B2
(45) Date of Patent: Mar. 6, 2012

(54) APPARATUS AND METHODS FOR MANAGING NETWORK RESOURCES

(75) Inventors: Ted T. Kuo, Palo Alto, CA (US); Li-Jen Wang, San Jose, CA (US); Bo-chieh Yang, San Jose, CA (US); Jeffrey D. Abramowitz, Menlo Park, CA (US); Andrea Peiro, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 178 days.

(21) Appl. No.: 12/577,674

(22) Filed: Oct. 12, 2009

(65) Prior Publication Data
US 2011/0087766 A1   Apr. 14, 2011

(51) Int. Cl.
*G06F 15/173* (2006.01)
(52) U.S. Cl. ...................................... 709/224
(58) Field of Classification Search .......... 709/223–224
See application file for complete search history.

(56) References Cited

U.S. PATENT DOCUMENTS

| | | | |
|---|---|---|---|
| 7,904,909 B1 * | 3/2011 | Reiner et al. | 718/104 |
| 2007/0094367 A1 * | 4/2007 | Esfahany et al. | 709/223 |
| 2007/0198665 A1 * | 8/2007 | De Matteis et al. | 709/220 |
| 2007/0266136 A1 * | 11/2007 | Esfahany et al. | 709/223 |
| 2011/0087766 A1 * | 4/2011 | Kuo et al. | 709/224 |

* cited by examiner

*Primary Examiner* — Jerry Dennison
(74) *Attorney, Agent, or Firm* — Shun Yao; Park, Vaughan, Fleming & Dowler LLP

(57) ABSTRACT

Apparatus and methods are provided for managing network resources. A central unified services and device management framework is operated to simultaneously manage various types of resources on behalf of multiple organizations. Within the framework, a common management layer provides services (e.g., account management, event logging) common to multiple different services and devices. Within a specific management layer, separate subsystems are implemented for different devices or types of devices. The device-specific subsystems invoke device-independent functional modules through primitives exposed by the common management layer. A given organization may establish tiered logical constructs to group resources deployed at different physical locations (e.g., cities, offices) or within different subdivisions of the organizations (e.g., subsidiaries, departments).

13 Claims, 4 Drawing Sheets

APPARATUS AND METHODS FOR MANAGING NETWORK RESOURCES

RELATED APPLICATIONS

The present application is related to co-pending U.S. patent application Ser. No. 12/577,684, entitled "Apparatus and Methods for Protecting Network Resources", which was filed Oct. 12, 2009 and is incorporated herein by reference.

BACKGROUND

This invention relates to the fields of computer systems. More particularly, apparatus and methods are provided for virtualized and centralized management of network devices and/or services.

The level of knowledge needed to effectively configure and operate computer system networks can be quite high. Large organizations typically maintain relatively large IT (Information Technology) staffs to configure and maintain equipment, assist users with operation of their equipment, apply security policies, monitor network security, etc. However, some organizations, particularly those that are smaller, cannot afford sufficient experienced full-time IT staff for performing all of these functions, and whoever may be tasked with IT responsibilities within such an organization may be unprepared for the myriad problems and challenges that may arise.

For example, securing an organization's network resources from unauthorized access is a critical task that can easily be performed in an incomplete or ineffective manner. Due to the complexity of the problem, the lack of effectiveness may not be apparent to the organization until the network has been breached. The amount of data stored electronically is prodigious and grows daily, and makes network security all the more important.

One reason it can be difficult to adequately secure network resources is the tension between the need to permit legitimate use of the resources without unreasonable difficulty, and the desire to prevent all illegitimate use. This tension increases as the number and type of resources deployed within an organization increases.

Each new type of resource may be configured in a different way to access permitted resources, apply a desired level of security, etc. Securing an organization's network resources is just one of many tasks and, without adequate IT staffing, this task may receive short shrift in the face of users' demands for real-time assistance. Thus, configuring and monitor network security must compete with tasks such as helping users configure their equipment for use within the organization.

Configuration of resources may be particularly difficult for an organization that employs multiple different types of equipment. In particular, a small organization that is cost-conscious may purchase the least expensive equipment for a particular operation, which may lead to a hodgepodge of components from different vendors and manufacturers. Thus, the organization may deploy multiple access points, switches or other communication components produced by different manufacturers.

Each different type or model of equipment typically has different configurable parameters or parameters that are configured in different manners. Although some parameters and methods of configuration may be identical across different devices, others will differ. Without sufficient familiarity or expertise in network components, an individual may easily configure a component incorrectly or waste time determining the correct configuration.

Some organizations choose to use automated provisioning to prepare new devices for use within their network. However, if an organization's security policies do not encompass the equipment for performing automated provisioning, or are not applied correctly during provisioning of the device, security vulnerabilities may be introduced into an organization along with the new device. Or, if the provisioning is performed in a haphazard or hurried manner, security policies may not be applied correctly or completely.

In addition, even after a given network component is initially configured, some parameters may need to be changed or updated as an organization's network evolves. Regular attention to the myriad network resources that may be deployed within an organization may be unrealistic, for an organization having a limited IT staff.

Existing solutions for managing an organization's networked devices and services tend to do so only for a single device or a single service. With no third party solutions to a small organization's need to manage multiple types of devices and/or multiple network services, the organization is left to do so as best it can.

Thus, configuration of components to securely and effectively operate within an organization's network can be difficult and time-consuming. And, even after the components are successfully integrated into the network and the organization's security policies, they need to be managed on an ongoing basis to allow the network to function well.

SUMMARY

In some embodiments of the invention, apparatus and methods are provided for providing unified management of an organization's network devices and services, to cover configuration, deployment, operation and/or other tasks as needed. One or more multiple organizations' resources may be managed by one entity.

In these embodiments, a unified services and devices management system is provided for managing the configuration, deployment and operation of physical devices and/or specific electronic services. Multiple types of devices/services may be managed, as well as multiple models or versions of a particular device type.

In some embodiments of the invention, tiered administrative or managerial domains are constructed to facilitate management of devices and/or services within different locations or divisions of one organization, or within different organizations. Using these domains, responsibility for managing devices and/or services can be delegated to various operators or managers.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, apparatus and methods are provided for centrally and virtually managing an organization's network resources. The centralized management is performed "in the cloud" without requiring dedicated management resources on the part of the organization.

More particularly, a management facility may be engaged by one or more organizations to manage their resources. For each organization, the facility maintains separate per-organization PKIs (Public Key Infrastructures) for securing access to each organization's network.

The facility receives and establishes connections with a myriad number of types and models of network equipment, such as access points, switches, routers, network-attached storage, and so on. In addition to promoting centralized and virtual management of a variety of devices, the facility can also be used to manage services offered within an organization's network.

Communications between the facility and a particular device or service transit a multi-layer framework. A received communication is normalized before being delivered to a specific management layer adapted to work with the service or the type/model of equipment that originated the communication. That layer invokes a common management layer to accomplish a particular function (e.g., retrieve a security policy, log an event, access an account parameter).

The multi-layer framework thus allows management of multiple services and various types and models of network devices with a common set of functional modules. As an organization develops its network, the framework is able to continue effectively managing the network regardless of the mix of components.

Figure 1:
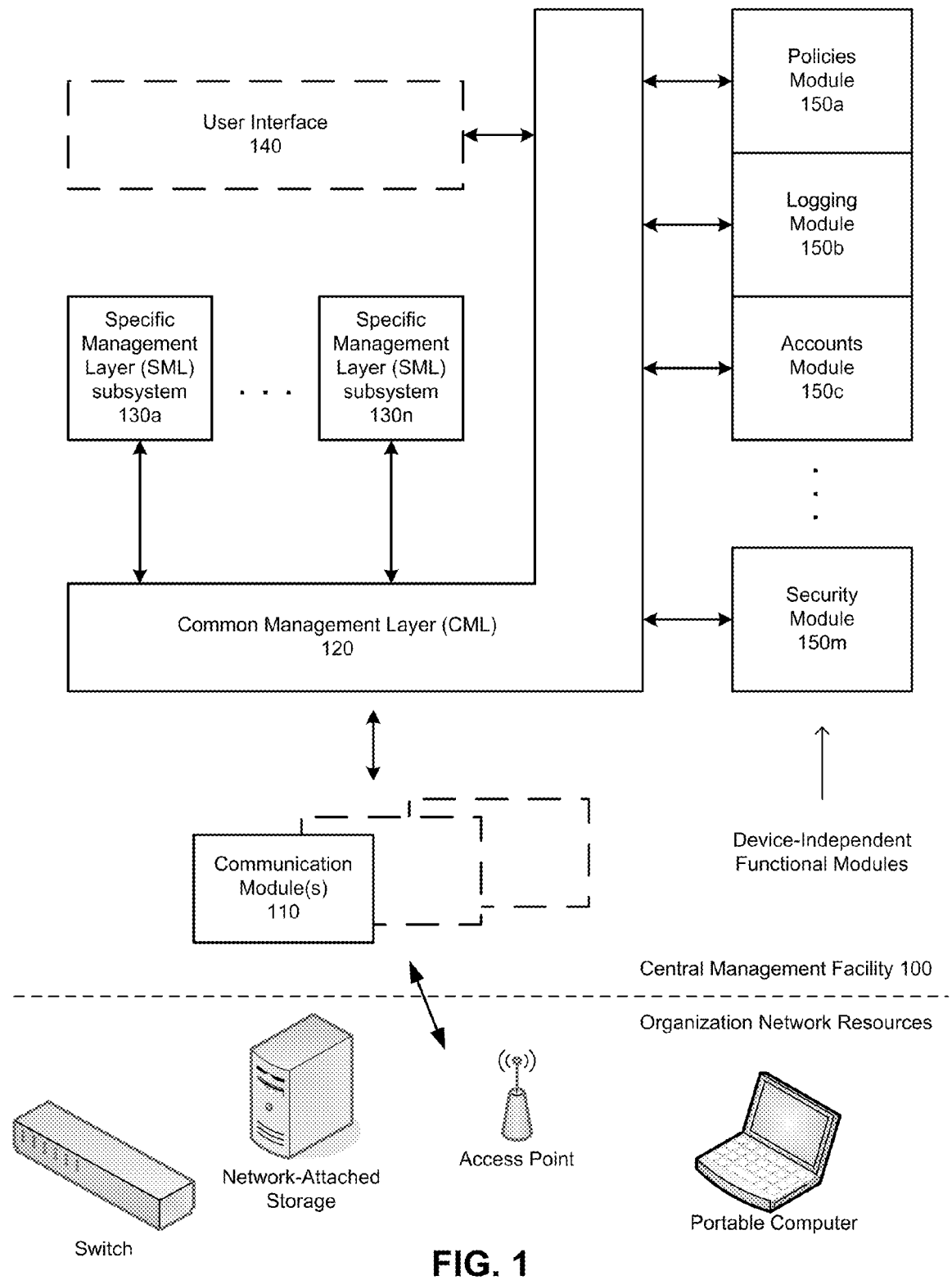
FIG. 1 is a diagram of a centralized facility for managing network resources of one or more organizations, according to some embodiments of the invention.

FIG. 1 is a diagram of a centralized facility for managing network resources of one or more organizations, according to some embodiments of the invention.

Central management facility 100 of FIG. 1 includes communication module(s) 110, common management layer (CML) 120, one or more specific management layer (SML) subsystems 130, optional user interface 140 and any number of device-independent functional modules 150. Any number of organizations may subscribe to the management services offered by the central management facility. The various modules of central management facility 100 may comprise hardware and/or software elements, and may operate within one or more cooperating or peer computer servers.

Not shown in FIG. 1 are one or more storage components of facility 100 (e.g., disks), which may be used to store device parameters, event logs, policies, digital certificates and any other data that is described herein.

Devices that facility 100 may centrally manage illustratively include wireless access points, routers, switches, network-attached storage devices, computing devices (e.g., notebook computers, workstations), and so on. Services managed by the facility may include wireless (and/or wired) network services, protection against viruses and/or other malware, network data storage, etc.

Central management of these device and service resources at a location remote from the organization alleviates the individual organizations from having to dedicate its own equipment and time to such activity. Management of an organization's resources may include such responsibilities as facilitating configuration or re-configuration, deployment and/or operation of the resources, application of a security policy, supervision of PKI certificates, user account management, user/device authentication, context-aware logging, device/service inventory, etc.

In the illustrated embodiments of the invention, individual resources within an organization's network are able to communicate with one or more communication modules 110. A communication module may be configured to receive connections via HTTP (Hypertext Transport Protocol), HTTPS (Hypertext Transport Protocol Secure), SNMP (Simple Network Management Protocol) and/or other communication protocols. Thus, different communication modules may receive different types of connections, from the same or different types of devices.

A communication from an organization resource is passed from a communication module 110 to common management layer (CML) 120 in a standard format. For example, a message may comprise a header portion configured to identify a device from which the message was received—possibly a particular device (e.g., including manufacturer, model and version), a general type of device (e.g., a network attached storage server), a specific type of device (e.g., Linksys wireless access point), a particular network service, etc.

A payload portion of the message may identify the resource's request or input. For example, the device or service may request operating parameters, a security policy, or some other information.

Common Management Layer 120 receives incoming messages from an organization's network resources, dispatches messages to the resources, provides an interface between device-independent functional modules 150 and both specific management layer subsystems 130 and user interface 140, and/or performs other duties. The CML defines management attributes and services that apply system-wide, while SML subsystems 130 work with specific devices and network services.

CML 120 may also facilitate operation and maintenance of separate PKIs for each organization client of the central management facility. A "security" or "PKI" device-independent functional module 150 may assist the CML in this role, or actually perform the role itself.

More particularly, for each organization client, the central management facility maintains a root Certificate Authority (CA) that anchors a PKI specific to that organization. The root CA can issue certificates for resources operating within the organization's network, and/or may issue one or more sub-root CA certificates to allow some of those resources (e.g., access points) to issue organization certificates to resource. The latter scheme allows new devices to be provisioned even if central management facility 100 is not currently available (e.g., in case the organization's internet access is disrupted).

Specific management layer subsystems 130 are associated with specific network devices, types of devices, or services. The device and service management subsystems adhere to a set of plug-in guidelines for providing specific management features. A registration process permits management subsystems to plug into the framework.

For example, a device-oriented SML subsystem may be implemented for one or more particular types of devices (e.g., access point, network attached storage server), models of a device (e.g., Linksys access point, Netgear access point), etc. A particular SML subsystem 130 is therefore adapted or configured to work with its associated network device(s), by setting or adjusting parameters of the device(s), logging events detected by the device(s), etc.

As for service-oriented SML subsystems, a WLAN (Wireless Local Area Network) management SML subsystem may offer management features such as an RF (radio frequency) coverage map, RF management, bandwidth assessment, radio transmit power adjustment, guest access policy features, detection of rogue access points, etc. A VPN (Virtual Private Network) SML subsystem may offer encryption methods, access policies and so on. Both service SMLs, however, call upon the same functional modules 150.

A new SML subsystem is registered with CML 120 via a registration API (Application Programming Interface) exposed by the CML. This allows the CML to know which SML subsystem to turn to for interaction with a particular network component.

When an SML subsystem 130 receives a message from a network device (via CML 120), it determines what action or actions need to be taken and calls other appropriate APIs of the CML in order to invoke the appropriate device-independent function module(s) 150. The SML thus only needs to issue primitives to the CML to instigate its desired action. As a result, individual SML subsystems need not be programmed with all the hooks and entry points into the various functional modules—only the CML needs these features.

Therefore, one difference between CML 120 and an SML subsystem 130 is that the CML defines management attributes and parameters that are applicable throughout the framework, while SML subsystems 130 define attributes and parameters that are specific to their associated devices and/or services.

Illustratively, CML 120 accepts device/service configuration requests (e.g., via user interface 140), parses the requests and routes them to the corresponding SML subsystem 130. Any attributes or configuration parameters that must be passed to a specific device or network service are forwarded by the device's or service's SML subsystem, through the CML. Similarly, operational statistics, events and/or other information are reported by specific devices/services to their SML subsystems, via the CML.

Configuration records are versioned and stored at facility 100 (e.g., within SML subsystems and/or functional modules), and a device's firmware can be automatically upgraded to a latest or specified version, or may be rolled back to a previous version. For example, in case of a fatal defect in a new firmware version or set of parameters, a device may be rolled back to default (e.g., factory) settings, or a last known good set of parameters may be applied.

Optional user interface 140 may be used to receive interactive communication sessions from representatives (e.g., system managers, administrators) of client organizations. For example, the user interface may comprise a web page from which an organization can subscribe to the facility's services, register equipment, purchase network components, etc.

In some embodiments of the invention, user interface 140 accesses device-independent functional modules 150 via CML 120, in order to create an account for an organization, register the organization's network resources, configure or store a security policy, review or retrieve logged events, etc. In other embodiments, the user interface may access the functional modules directly (e.g., without invoking the common management layer). Similarly, to effect action for a particular device or type of device, user interface 140 may interact directly with an SML subsystem (or interact via CML 120).

In some embodiments of the invention, user interface 140 may be omitted or may be subsumed into another module (e.g., common management layer 120). Illustratively, in these embodiments an organization may interact with central management facility 100 via an application program operating on a computing device, via a configuration utility of a network resource, or some other communication conduit other than a web page or other central, dedicated user interface. For example, CML 120 may publicly expose APIs for account creation/management, configuring organization resources, and so on, and allow third-parties to provide software for invoking those APIs.

Device-independent functional modules 150 provide functionality that is common to multiple devices, types of devices and/or organizations. For each organization, a separate set of data may be maintained regarding the organization's network, users, devices and services. Because separate PKI schemes are maintained for each organization, and each user/device/service of an organization must authenticate itself to the facility, each organization's data is protected against access by other organizations.

Policies module 150a may be configured to store various security policies, firewall policies and/or other operating policies that an organization may wish to apply to some or all of its devices and/or services. A given policy may specify times/days that particular components can or cannot operate, how an organization's access points are to be logically configured, which devices may be used with a particular service, etc.

Another illustrative policy for an organization may provide that if a particular network device connects to management facility 100 after it was reported as lost, stolen or compromised, the device is refused access. Further, the policy may specify that the device should be instructed to wipe (delete) its configuration data, which will make it unusable. The device may be identified by a digital certificate, serial number, MAC address or other identifier.

Yet another policy may be applied to set a topology of an organization's network. For example, if the organization employs multiple wireless access points, only one of them may be coupled to the Internet (or other external network). A policy may specify which access points can talk to which other access points. A policy for configuring the access points topology may be selected based on the types/models of access points, their loads (e.g., number of client devices that connect to them) and/or other factors.

Logging module 150b is configured to contextually log events reported by organization's network resources. Thus, this module may record login/logout times of users, security alerts, virus detections, use of a device/service and so on. The logging module may offer text-based searching of device/service logs, contextual hypertext capability and/or other features. For example, a MAC address or other identifier (e.g., serial number, IP address) reported in a log may be clickable and lead to a management page showing further information of the logged event, a page for taking corrective or remedial action, etc.

Thus, a device MAC address reported on a rogue access point log can be selected to navigate to a rogue access point management page within the central management framework, while a MAC address reported in a guest logon event log may be used to navigate to a guest access management page.

Accounts module 150c is configured to maintain organizations' and users' accounts. Thus, for each organization, one or more login accounts may be assigned to allow users and resources of that organization to access central management facility 100.

Security module 150m is configured to help secure organizations' networks. For example, the security module may manage the organizations' PKIs and be responsible for authenticating users/devices, issuing digital certificates within a PKI, etc.

To add a new functional module 150, only CML 120 needs to be programmed with the entry points, APIs or other methods of invoking the module. The CML will then publish the module's APIs or otherwise make the module's functionality available to SML subsystems 130.

Because the framework may be used to manage multiple organizations' networks, each organization registers its devices with device identifications (Dev_ID) and/or group identifications that identify a set of the organizations' devices (Grp_ID). The registration process may be combined with a system for ordering network resources so that, for example, a particular Grp_ID could comprise a purchase order under which a set of devices was purchased.

When a purchased device is connected to an organization's network, it establishes a secure connection to central management facility 100 and presents its Dev_ID. The framework (e.g., an SML subsystem for the device) authenticates the device, binds it to the organization and downloads configuration data to the device. In some embodiments, devices shipped to the organization are preloaded with security credentials.

In other embodiments, an administrator within the organization may place a newly connected device on a list of devices pending approval to operate within the organization's network. Once the administrator accepts the device, it is then bound to the organization.

A device may have to initiate a network connection to facility 100 through a firewall. In this case, a preloaded security credential in the device can be used to establish a suitable secure connection, such as with secure hypertext transport protocol (HTTPS).

In some cases, a User Datagram Protocol (UDP) based heartbeat mechanism can be established to keep a communication channel open, at a firewall, between a device and the framework. The device periodically sends a heartbeat message over a UDP connection to facility 100. The heartbeat serves to advise the framework of the device's status and to keep the firewall open. Whenever central management facility 100 has some information for the device, it can send a short command over this UDP channel to instruct the device to establish another data channel to exchange additional information.

It is possible for a device to be deployed before the organization is created or registered at facility 100 or before the device's Dev_ID has been registered to the organization. In this case, the device may attempt multiple times to contact the facility.

Once a device has been authenticated and accepted into an organization with the framework, the framework retrieves corresponding device configuration and system policies and downloads them to the device. After the configurations and policies are implemented, the device enters normal operation state and starts providing its services.

In some embodiments of the invention, an organization may define one or more logical constructs associated with different offices or locations of a company, different companies within a conglomerate, different customers of one management provider, etc.

For example, when an organization subscribes to central management facility 100, it may specify that the organization operates three discrete offices (e.g., in different cities, with different internal networks). For each office, the organization may specify particular operating parameters for some or all devices at that location—such as an SSID (Service Set Identification or Service Set Identifier) of its wireless network, a preferred security protocol for wireless devices, a routing table, addresses of preferred DNS (Domain Name Service) servers, etc. Subsequently, for a new network component assigned to that office, the specified parameters will be automatically applied, without anyone having to specifically associate the parameters with the new device.

Illustratively, the term "site" may be used herein to refer to a collection of parameters to be assigned to all relevant resources of an organization's network deployed within an office, branch, outlet or other location associated with the "site." Above the site level, other logical constructs may be defined.

For example, just as multiple "sites" may be defined, multiple logical "organizations" may be defined to pertain to different parts (e.g., divisions, departments, subsidiaries) of a multi-organizational entity (e.g., a conglomerate). If not part of a larger entity, an "organization" represents a discrete organization (e.g., one client of central management facility 100).

In the same manner that operating parameters and data defined for a "site" construct are inherited by any compatible devices or components assigned to that site, so too parameters and data defined for an "organization" construct may be inherited by any subordinate sites. Thus, by the time an individual device or service is added to an organization's network, most or all operating parameters may already be defined. If those parameters are complete, no time or effort need be dedicated to determining the appropriate configuration of the new device or service.

An even higher level logical entity such as a "manager" may be defined for an entity that is hired by multiple discrete organizations to manage their networks. Specifically, a "manager" entity may represent a company or contractor hired by multiple organizations to manage their "organization" entities (and, by extension, any "sites" within those organizations).

An organization may change managers, in which case the previous "manager" entity loses the ability to access the organization's "organization" entity or entities, in favor of the new "manager". For example, any digital certificates issued to computer systems controlled by the old manager may be revoked, thereby preventing those systems from accessing the organization's network. In some embodiments of the invention, an organization always possesses the ability to manage its network (even if a separate "manager" has been hired), and can assign that role to another entity or fire an existing "manager."

Thus, account management within central management facility 100 may be hierarchical to allow a single operator to manage one or more organizations. For example, the operator may be an employee of a single organization, or represent an entity that manages multiple organizations' networks.

A management/organization account for an organization within facility 100 may therefore serve as a system management center for the configuration and/or monitoring of the organization's network devices and services. An operator managing multiple organizations/sites can open multiple instances to monitor or work within more than one organization/site at a time, with the individual instances acting as dashboards and launch pads to assist their monitoring and configuration activities.

In order for an organization to allow another entity to exercise administration rights over its network resources, the organization may initiate a request to share the organization's administration with the entity. Only the organization itself can elect to share administration rights; the receiving organization cannot further share those rights. The organization terminates the arrangement by initiating a termination request.

In order for a new device or service of an organization's network to automatically interact with central management facility 100 to retrieve configuration parameters, it may be manufactured or configured to automatically request or determine a location (e.g., a Uniform Resource Locator or URL) from which it can obtain such information. For example, a particular firmware parameter of a device may be set to cause the device to automatically contact a specified entity (e.g., management facility 100) or to request (at startup) a URL or other address of an entity from which it can receive configuration data. This parameter may be named "Enable Network" or "Receive Remote Configuration" or anything else.

When a device or service contacts the specified or identified entity, it will identify itself (e.g., model of equipment, version, serial number, MAC address, service name/identifier) and possibly deliver a digital certificate it possesses. After being authenticated and confirmed as an authorized component of the organization's network, it will receive and apply a set of parameters.

As described above, even though central management facility 100 of FIG. 1 may be employed to manage multiple organizations' network within the same overall framework, strict access policies and data isolation prevent data migration between organizations. Specifically, per-organization PKIs are established to protect each organization's resources. Each organization has a root certificate authority at the facility, and subordinate certificate authorities and authenticators within the organization's network perform local client access authentication and enforcement of access policies.

Figure 2:
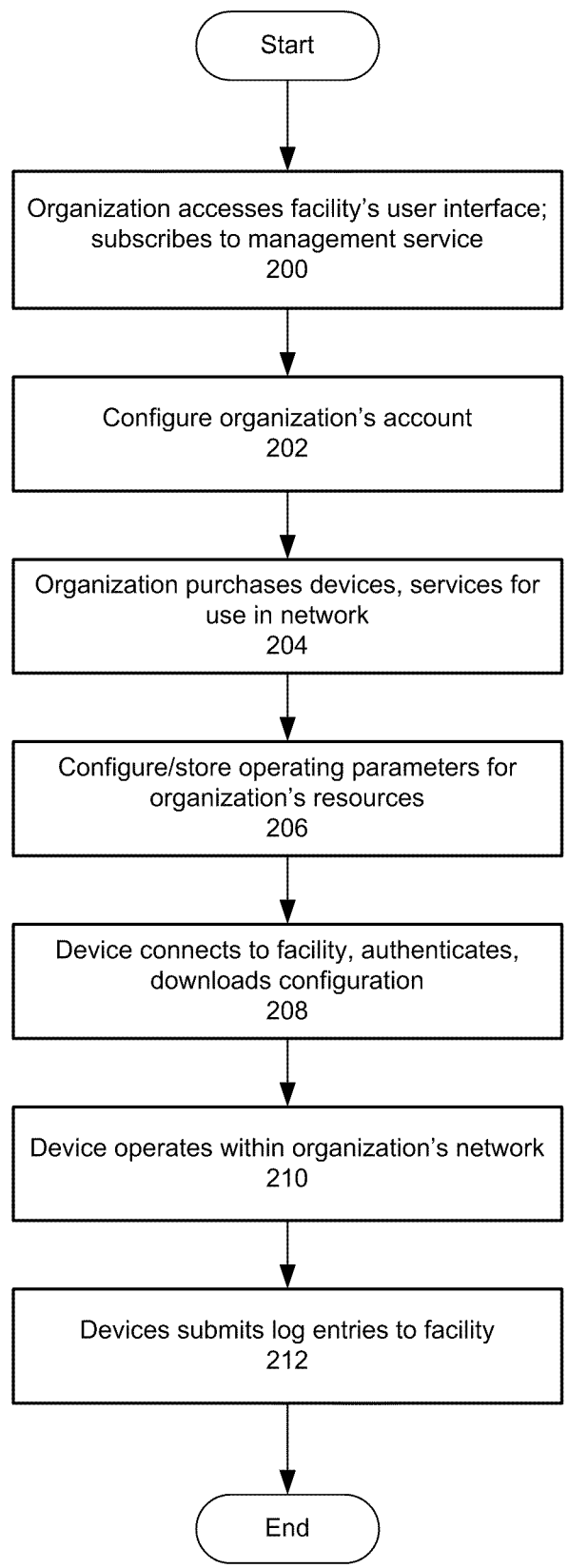
FIG. 2 is a flow chart demonstrating a method of centrally managing an organization's network resources, according to some embodiments of the invention.

FIG. 2 is a flow chart demonstrating a method for central and remote management of an organization's network resources, according to some embodiments of the invention.

In these embodiments, a unified services and device framework comparable to central management facility 100 of FIG. 1 provides to multiple organizations services such as user account management, user and device authentication, context-aware logging of events, device inventory, firmware management, PKI management/administration, etc.

As described above, separate specific management layer subsystems are implemented to support different services, specific devices and/or types of devices. Each such subsystem adheres to a set of plug-in standards for interfacing with a common management layer and thereby accessing device-independent functional modules. Additional device-specific subsystems may be added as needed to support additional devices or services.

In operation 200, an organization subscribes to the central facility's unified services and device management. Illustratively, the organization (e.g., a system administrator) may connect to a user interface at a computer server operated by the facility to submit a subscription request.

Alternatively, the organization (e.g., a network administrator) may execute an application or utility that automatically interfaces with the facility and provides the same or similar functionality as a dedicated user interface.

In operation 202, an account for the organization is configured to identify the organization, create one or more user accounts, identify devices presently deployed in the organization's network, identify specific services required by the organization, etc.

Operation 202 may entail defining multiple logical "sites" and/or "organizations" to allow for more particularized management of the organization's resources. As described above, different "site" constructs may correspond to different branches, offices or other locations of the organization, while different "organization" constructs may correspond to different divisions, subsidiaries, organizational units or other portions of the organization.

In operation 204, the organization purchases some number of resources (e.g., wireless LAN controllers, access points, network-attached storage units). The resources may be purchased from an operator of the central facility or some other source. Advantageously, however, the vendor may be authorized and equipped to pre-load the resources with security credentials that are sufficient to allow the resources to make initial contact with the central facility after they are connected to the organization's network.

Alternatively, a configuration device or utility (e.g., a client device enabler) may be provided with (or separate from) the purchased resources, and may be used to configure the resources for operation within the organization. This configuration effort may include loading security credentials.

Even though the organization will deploy multiple different devices and services, they will all be manageable through the central facility.

In operation 206, a set of operating parameters for some of or all the purchased network resources is submitted to the framework by the organization. Depending on the level of knowledge of the organization's representative performing this operation, that person may specify exact parameters for one or more devices or may allow the facility to determine suitable parameters.

For example, the representative may state that data security is very important to the organization, in which case the facility may select a more robust security protocol and a more stringent access control policy for the organization's wireless resources than it would if security were less of a concern. Similarly, the facility may select different operating policies, logging requirement and/or other settings depending on the representative's input. Different templates may be applied to implement different sets of parameters.

As part of operation 206, configuration data specified by the organization representative and/or selected by the facility for the devices/services identified by the representative are parsed by the facility's central management layer (CML) and routed to the appropriate specific management layer (SML) subsystem. The SML may save the data within the subsystems or via one or more appropriate device-independent functional modules. These SML subsystems will be responsible for issuing the device configuration information to the organization's network resources.

One configuration effort the facility may perform is to load a security credential (e.g., a digital certificate) on a device prior to shipment to the organization and deployment within the organization's network. To facilitate initial deployment of some network devices (e.g., access points, client device enablers), the devices may be configured with a security credential issued within a PKI associated with the central management facility (e.g., instead of a PKI of the organization). After the devices are deployed, they may interact with the facility and receive new security credentials generated within the organization's PKI.

In operation 208, a device is deployed and connected to the organization's network. As part of its startup and configuration, the device establishes a secure connection (e.g., via https) with the facility, identifies itself (e.g., with a device ID, a MAC address) and may authenticate itself using a security credential preloaded onto the device.

In some embodiments, a client device enabler or other entity employed to configure a new device may help establish the initial connection to the facility.

If the device is accepted as valid (e.g., the facility may maintain a list of device IDs valid for the organization), it is bound to the organization. Then, configuration parameters, system policies, firmware and/or other information for the device are downloaded and applied. As described above, the configuration parameters may be specified exactly by an organization representative, may be selected by the facility and/or may be inherited from a "site" or "organization" logical construct.

In operation 210, the device is configured with policies and configuration parameters, and can begin normal operation within the organization's network. As described previously, these policies, attributes and parameters may be provided by device-independent functional modules and disseminated to specific devices and different types of devices by corresponding specific management layer subsystems.

In operation 212, during operation of the device, it submits contextual log events to the management framework. The events are transmitted to the framework via a communication module and a common management layer before being delivered to an SML subsystem associated with the device. That device then invokes functions/services of a logging module via the common management layer. The logging module can thus log events for multiple different devices within the organization's network.

In some embodiments of the invention, a central management facility exposes RESTful APIs—APIs that conform to the Representational State Transfer architecture. This allows easy retrieval of information from the facility—such as network traffic statistics, radio signal coverage, etc.

A method such as that described in conjunction with FIG. 2 may be used to manage a device such as a WLAN (Wireless Local Area Network) controller. The controller acts as a centralized management point for some or all of an organization's access points (APs), and may be a dedicated device or may be embedded in another appliance (e.g., an Ethernet switch).

Illustratively, it provides AP management, user management, RF (Radio Frequency) management, WLAN access policy management, and so on. The WLAN controller is tied to a unified services and device management framework (e.g., facility 100 of FIG. 1) via a WLAN specific management layer subsystem.

The common management layer of the framework provides common services such as user account management, client device provisioning, access policies, etc. The WLAN subsystem within the specific management layer of the framework provides device-specific services, such as rogue AP detection, RF management, WLAN bandwidth access assessment, AP configuration and monitoring, etc.

Once the WLAN controller subsystem is registered within the framework, it is available to all subscribers (e.g., not just the organization that first deployed a WLAN controller). For each subscriber, a separate WLAN controller services instance is created and added to the subscriber's account. Once the service is no longer needed, the instance can be destroyed.

Figure 3:
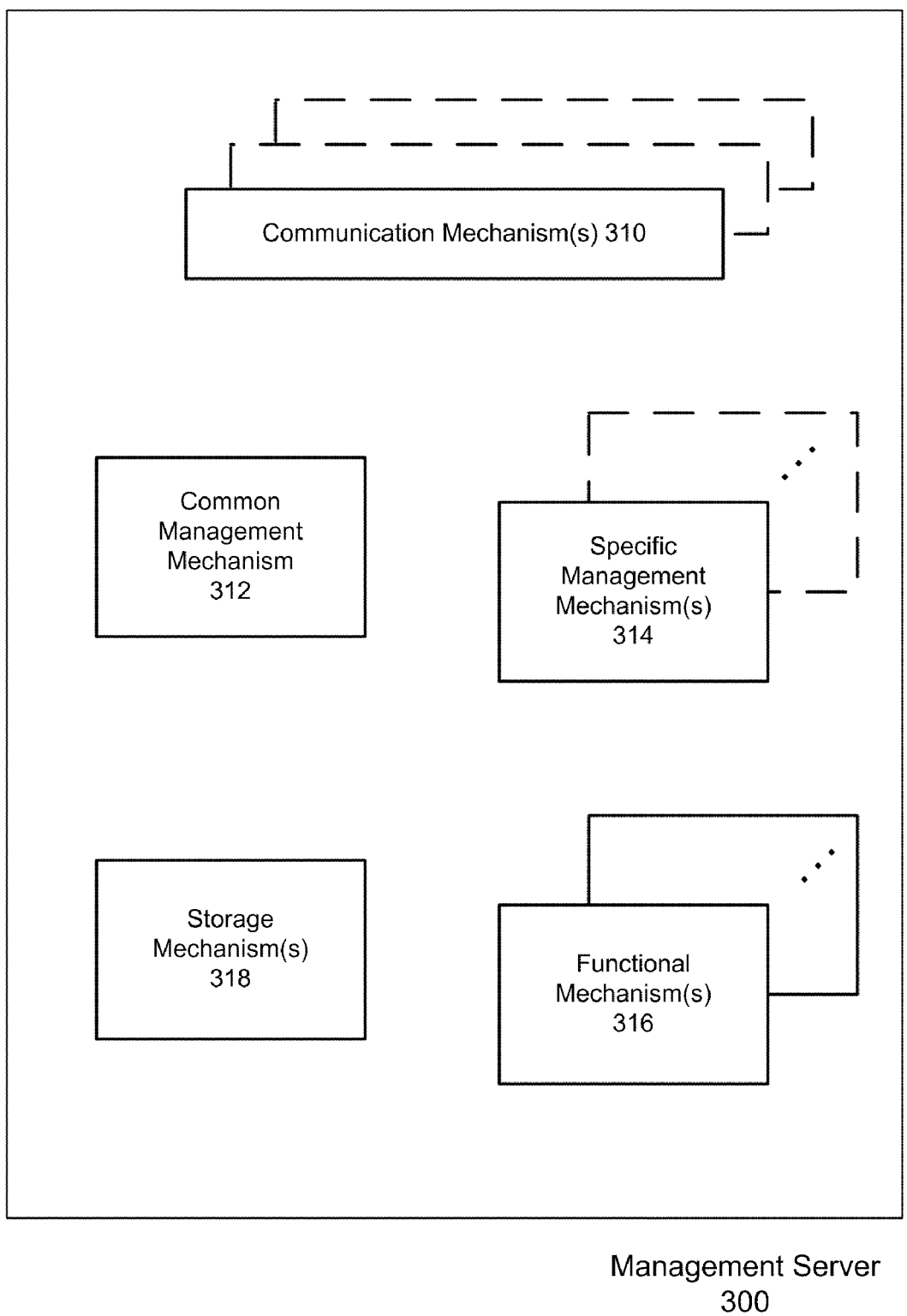
FIG. 3 is a block diagram of hardware apparatus for protecting access to an organization's network resources, according to some embodiments of the invention.

FIG. 3 is a block diagram of hardware apparatus for managing one or more organizations' network resources, according to some embodiments of the invention.

Management server 300 comprises communication mechanism(s) 310, common management mechanism 312, specific management mechanism(s) 314, functional mechanism(s) 316, and storage mechanism(s) 318. Any or all of these mechanisms may be combined or subdivided in other embodiments of the invention.

Communication mechanism(s) 310 are adapted to exchange communications with network devices (e.g., access points, network attached servers, switches). A communication mechanism may comprise or be coupled to a user interface manipulable to facilitate access to the management server.

Common management mechanism 312 is adapted to provide central management functions of management server 300. Mechanism 312 thus routes incoming communications from communication mechanism(s) 310 to appropriate specific management mechanisms 314, invokes a functional mechanism 316 on behalf of a specific management mechanism or some other internal or external entity, and takes other action as appropriate.

Specific management mechanism(s) 314 are adapted to interact with specific services, devices or types of devices within an organization's network, to configure those services and/or devices, monitor their operation, troubleshoot, etc. Additional mechanism(s) 314 may be added to management server 300 as an organization's network expands or diversifies.

Storage mechanism(s) 316 are adapted to store information used by the management server. Such data may relate to an organization's account with the management service, configurations of the organization's devices and/or services, access policies, event logs, security credentials, etc.

Figure 4:
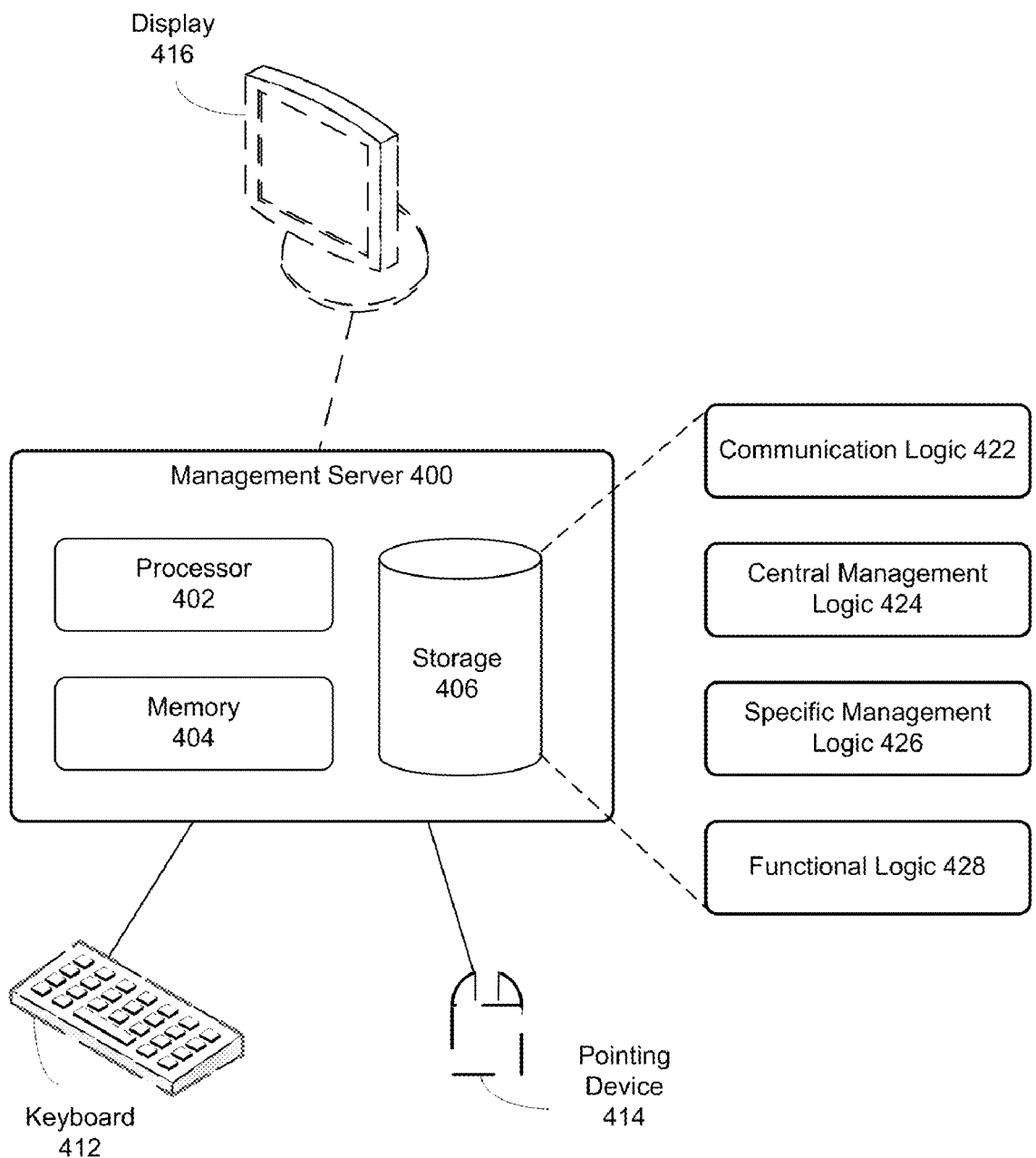
FIG. 4 is a block diagram of an authentication server, according to some embodiments of the invention.

FIG. 4 is a block diagram of a management server for managing components of one or more organizations' networks, according to some embodiments of the invention.

Management server 400 of FIG. 4 comprises processor 402, memory 404 and storage 406, which may comprise one or more optical and/or magnetic storage components. Management server 400 may be coupled (permanently or transiently) to keyboard 412, pointing device 414 and display 416.

Storage 406 of the online rating system stores logic that may be loaded into memory 404 for execution by processor 402. Such logic includes communication logic 422, central management logic 424, specific management logic 426 and functional logic 428.

Communication logic 422 comprises processor-executable instructions for communicating with an organization's network devices and services, operators tasked with managing the organization's resources and/or other entities. Logic 422 may include a user interface and/or publicly accessible APIs for invoking other logic stored on management server 400. A management server may comprise multiple sets of communication logic for purposes of load-balancing, accepting communication connections employing different protocols or for other reasons.

Central management logic 424 comprises processor-executable instructions for performing central management tasks, including communicating/calling between different logic.

Specific management logic 426 comprises processor-executable instructions for facilitating management of specific network services, devices and/or types of devices. Multiple sets of specific management logic may be employed for different services, devices and/or types of devices.

Functional logic 428 comprises processor-executable instructions for performing device- and/or service-independent functions that may be invoked for multiple different services and/or devices within an organization's network. Multiple sets of functional logic may be employed for different functional areas (e.g., account management, event logging, policies, security).

In other embodiments of the invention, a management server may include additional logic, such as for registering individual components, managing operation of the server, replicating server data to other instances of the management server, operating a user interface, etc. Logic for operating and managing per-organization PKI schemes may be part of or separate from the logic illustrated in FIG. 4.

The environment in which a present embodiment of the invention is executed may incorporate a general-purpose computer or a special-purpose device such as a hand-held computer. Details of such devices (e.g., processor, memory, data storage, display) may be omitted for the sake of clarity.

Data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), and other media capable of storing computer-readable media now known or later developed.

Methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. An apparatus for managing heterogeneous network resources of multiple organizations, the apparatus comprising:
   a processor;
   a memory;
   multiple device-independent functional modules configured to perform functions on behalf of multiple different types of devices within each of the organizations' networks;
   for each different type of device, a specific management module configured to manage operation of the corresponding type of device; and
   a common management module configured to:
      receive a request for configuration from a device on an organization's network;
      parse the device's request to identify the type of the device; and
      invoke one of the device-independent functional modules, on behalf of a specific management module that corresponds to the device's type, to configure the device;
   wherein a separate instance of the specific management module is instantiated for different organizations.

2. The apparatus of claim 1, further comprising:
   one or more communication modules configured to establish communication connections with the multiple different types of devices.

3. The apparatus of claim 1, wherein said multiple device-independent functional modules comprise:
   a policies module configured to offer operating policies for the multiple different types of devices;
   a logging module configured to log events reported by the multiple different types of devices; and
   an account module configured to facilitate management of an account associated with the first organization.

4. The apparatus of claim 1, further comprising:
   a user interface configured to receive configuration parameters for the multiple different types of devices from an administrator of an organization's network.

5. The apparatus of claim 1, wherein said specific management modules comprise:
   a first specific management module corresponding to wireless access points; and
   a second specific management module corresponding to network attached storage servers.

6. The apparatus of claim 1, wherein said specific management modules comprise:
   a first specific management module corresponding to wireless access points manufactured by a first manufacturer; and
   a second specific management module corresponding to wireless access points manufactured by a second manufacturer.

7. The apparatus of claim 1, wherein said specific management modules comprise:
   a first specific management module corresponding to a first model of a wireless access point manufactured by a first manufacturer; and
   a second specific management module corresponding to a second model of a wireless access point manufactured by the first manufacturer.

8. The apparatus of claim 1, further comprising, for a first organization:
   multiple logical site constructs, wherein each said logical site construct is configured to encompass network resources of the first organization located at one physical site.

9. The apparatus of claim 1, further comprising, for a first organization: multiple logical organization constructs, wherein each said logical organization construct is configured to encompass network resources located within a corresponding subdivision of the organization.

10. A method of centrally managing multiple types of devices in a network, the method comprising:
   for each of the multiple types of devices, receiving a first set of operating parameters;
   receiving a secure communication connection from a device operating within the network;
   receiving from the device a request for configuration;
   parsing the device's request to identify the type of the device;
   invoking a device-independent functional module to determine a second set of operating parameters for configuring the device, wherein multiple device-independent functional modules are configured to perform functions on behalf of multiple different types of devices within the network;

routing the device's request to a specific management module corresponding to the device's type; and from the specific management module, transmitting the corresponding first and second sets of operating parameters to the device.

11. The method of claim 10, further comprising: defining multiple logical site constructs for a first organization, wherein each said logical site construct is configured to encompass network devices of the first organization located at one physical site.

12. The method of claim 10, further comprising, for a first organization:

defining multiple logical organization constructs for a first organization, wherein each said logical organization construct is configured to encompass network devices located within a corresponding subdivision of the organization.

13. A non-transitory computer-readable medium storing instructions that, when executed by a computer, cause the computer to perform a method of centrally configuring multiple types of devices in a network, the method comprising:

for each of the multiple types of devices, receiving a first set of operating parameters;

receiving a secure communication connection from a device operating within the network;

receiving from the device a request for configuration;

parsing the device's request to identify the type of the device;

invoking a device-independent functional module to determine a second set of operating parameters for configuring the device, wherein multiple device-independent functional modules are configured to perform functions on behalf of multiple different types of devices within the network;

routing the device's request to a specific management module corresponding to the device's type; and from the specific management module, transmitting the corresponding first and second sets of operating parameters to the device.

* * * * *